ary well suited for use in lightning ar-
UNITED STATES PATENT OFFICE.

JOHN COULSON, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROLYTE.

1,255,391.

Specification of Letters Patent.

Patented Feb. 5, 1918.

No Drawing.  Application filed April 5, 1917.  Serial No. 159,923.

*To all whom it may concern:*

Be it known that I, JOHN COULSON, a subject of the King of Great Britain, and a resident of Wilkinsburg, in the county of Allegheny and State of Pennsylvania, have invented a new and useful Improvement in Electrolytes, of which the following is a specification.

My invention relates to electrolytic cells such as condensers, lightning arresters and rectifiers, and it has for its object to provide an electrolyte which shall be capable of acting upon film-forming metals such as aluminum, magnesium, tantalum and the like to produce and maintain durable dielectric films thereon and to prevent the formation of deleterious fungus growths upon the plates.

I have discovered that electrolytes consisting of dilute aqueous solutions of certain salts containing arsenic are highly effective electrolytes for cells of the above-indicated character, the arsenic salts being present either as the only dissolved material in the electrolyte or being employed in admixture with other dissolved material. Among the arsenic-containing salts which are suitable for my present purpose are potassium arsenate, potassium arsenite, ammonium arsenate and ammonium arsenite.

A dilute solution of potassium arsenate, containing, for example, 2% or less of dissolved material, if the cell is to be operated under high voltages, gives good results when employed as the electrolyte in a condenser, lightning arrester or similar cell having active plates of aluminum, and the cell containing this electrolyte may be maintained continuously under alternating-current potentials as high as 400 volts without appreciable deterioration and with an initial power-factor loss of about 6%, rising to a maximum of 10% to 12% during continuous operation. The instantaneous break-down voltage is about 425 to 450 volts and the capacity of the plates is about $\frac{1}{10}$ microfarad per square centimeter when the plates are given a preliminary acid treatment according to the process described and claimed in my copending application for Letters Patent, Serial No. 54,590, filed Oct. 7, 1915. For lower operating voltages, the concentration of the electrolyte may be considerably greater than 2%.

The potassium arsenate electrolyte is particularly well suited for use in lightning arresters, for the reason that it possesses the property of rapidly restoring films upon the active plates of the cell when such films are ruptured by lightning discharges or otherwise. The other arsenic-containing salts mentioned above give results which are similar to those specifically mentioned in connection with potassium arsenate.

A particularly beneficial effect of arsenic-containing electrolytes in electrolytic cells of the above-indicated character is the prevention of fungus growths which tend to form upon the active plates of such a cell in the course of its operation, particularly when electrolytes of considerable concentrations are employed. The arsenic exerts an effective sterilizing effect upon the solution and upon the plates and, for this reason, it is often desirable to add a small amount of arsenic-containing electrolyte to other electrolytes such as those containing tartrates, citrates and other organic salts which, when employed by themselves, tend to form deleterious growths upon the plates of the cell.

While I have mentioned certain specific salts containing arsenic, it is to be understood that my invention is not restricted to the use of these particular salts or to the specific concentrations which I have mentioned. The advantages herein described are characteristic, to a greater or less degree, of all soluble salts of arsenic acid and arsenous acid, and I desire, therefore, that no limitations as to materials, proportions or other conditions shall be imposed upon my invention except such as are indicated in the appended claims.

I claim as my invention:

1. An electrolyte for electrolytic condensers, lightning arresters, rectifiers and the like comprising an aqueous solution containing a compound of arsenic.

2. An electrolyte for electrolytic condensers, lightning arresters, rectifiers and the like comprising an aqueous solution containing an alkali-radical compound of arsenic.

3. An electrolyte for electrolytic condensers, lightning arresters, rectifiers and the like comprising an aqueous solution containing a potassium compound of arsenic.

4. An electrolyte for electrolytic condensers, lightning arresters, rectifiers and the like comprising an aqueous solution containing an arsenate.

5. An electrolyte for electrolytic condensers, lightning arresters, rectifiers and the like comprising an aqueous solution containing an alkali-radical arsenate.

6. An electrolyte for electrolytic condensers, lightning arresters, rectifiers and the like comprising an aqueous solution containing potassium arsenate.

7. An electrolyte for electrolytic condensers, lightning arresters, rectifiers and the like comprising an aqueous solution containing not substantially more than 2% of potassium arsenate.

8. An electrolyte for electrolytic condensers, lightning arresters, rectifiers and the like comprising an aqueous solution containing not substantially more than 1% of potassium arsenate.

9. An electrolyte for electrolytic condensers, lightning arresters, rectifiers and the like comprising an aqueous solution containing a compound of arsenic and another dissolved material.

In testimony whereof, I have hereunto subscribed my name this 30th day of March, 1917.

JOHN COULSON.